(12) United States Patent
Inami

(10) Patent No.: US 10,626,829 B2
(45) Date of Patent: Apr. 21, 2020

(54) FUEL REFORMER FOR VEHICLE

(71) Applicant: Toyota Jidosha Kabushiki Kaisha, Toyota-shi, Aichi-ken (JP)

(72) Inventor: Norio Inami, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1 day.

(21) Appl. No.: 15/954,017

(22) Filed: Apr. 16, 2018

(65) Prior Publication Data

US 2018/0306145 A1    Oct. 25, 2018

(30) Foreign Application Priority Data

Apr. 20, 2017  (JP) .................... 2017-083775

(51) Int. Cl.
| | |
|---|---|
| *F02M 27/06* | (2006.01) |
| *B01J 19/12* | (2006.01) |
| *B60K 15/03* | (2006.01) |
| *F02M 37/00* | (2006.01) |
| *C10G 15/08* | (2006.01) |

(52) U.S. Cl.
CPC ............ *F02M 27/06* (2013.01); *B01J 19/123* (2013.01); *B60K 15/03* (2013.01); *C10G 15/08* (2013.01); *F02M 37/0082* (2013.01); *B01J 2219/0801* (2013.01); *B01J 2219/0877* (2013.01); *B01J 2219/1203* (2013.01); *B60K 2015/03427* (2013.01)

(58) Field of Classification Search
CPC ....... F02M 27/06; B01J 19/123; B60K 15/03; C10G 15/08
See application file for complete search history.

(56) References Cited

U.S. PATENT DOCUMENTS

| | | | |
|---|---|---|---|
| 7,377,269 B1 * | 5/2008 | Lai ....................... | F02M 27/045 123/538 |
| 2004/0237948 A1 | 12/2004 | Magyari | |
| 2009/0260592 A1 | 10/2009 | Niwa et al. | |
| 2011/0236255 A1 | 9/2011 | Parfitt et al. | |
| 2012/0037098 A1 * | 2/2012 | Wey ....................... | F02B 51/06 123/3 |

FOREIGN PATENT DOCUMENTS

| | | |
|---|---|---|
| CN | 201025176 Y | 2/2008 |
| JP | H10176615 A | 6/1998 |
| JP | 2000-161154 A | 6/2000 |
| JP | 2003160790 A | 6/2003 |
| JP | 2004-068800 A | 3/2004 |
| JP | 2005520093 A | 7/2005 |
| JP | 2006-291143 A | 10/2006 |

(Continued)

*Primary Examiner* — Kevin A Lathers
(74) *Attorney, Agent, or Firm* — Dinsmore & Shohl LLP

(57) ABSTRACT

Provided is a fuel reformer for a vehicle. The vehicle includes an internal combustion engine, a fuel tank in which fuel of the internal combustion engine is stored, and a fuel supply device configured to supply the fuel in the fuel tank to the internal combustion engine. The fuel reformer includes an irradiator configured to emit light from an irradiation portion. The irradiation portion is disposed at a position where the fuel stored in the fuel tank is irradiated with the light without the light passing through a gas phase region in the fuel tank.

7 Claims, 10 Drawing Sheets

(56) References Cited

FOREIGN PATENT DOCUMENTS

| JP | 2008209202 A | 9/2008 |
| JP | 2008209611 A | 9/2008 |
| JP | 2010-084568 A | 4/2010 |
| JP | 2010-106689 A | 5/2010 |
| JP | 2010112199 A | 5/2010 |
| WO | 2010/026416 A1 | 3/2010 |
| WO | 2010/150340 A1 | 12/2010 |

* cited by examiner

FUEL REFORMER FOR VEHICLE

CROSS-REFERENCE TO RELATED APPLICATIONS

This application claims priority to Japanese Patent Application No. 2017-083775 filed on Apr. 20, 2017, incorporated herein by reference in its entirety.

BACKGROUND

1. Technical Field

The present disclosure relates to a fuel reformer that reforms fuel supplied to an internal combustion engine mounted on a vehicle.

2. Description of Related Art

In the related art, a control device (hereinafter, referred to as "device of the related art") that irradiates fuel (liquid fuel) with ultraviolet light to promote vaporization of the fuel is known (for example, refer to Japanese Unexamined Patent Application Publication No. 2005-520093 (JP 2005-520093 A)). The device of the related art irradiates a fuel irradiation region (vaporization chamber) with ultraviolet light and supplies fuel (vaporized fuel) vaporized by the ultraviolet light to an internal combustion engine, the fuel irradiation region being provided in a part of a fuel path through which fuel is supplied to the internal combustion engine.

SUMMARY

However, in the device of the related art, in a case where at least one of a flow rate or a flow velocity of the fuel passing through the fuel irradiation region is relatively high, energy needed for vaporizing the fuel cannot be imparted to the fuel. As a result, the vaporization of the fuel may be insufficient. Thus, reduction of fuel consumption and emission may be insufficient.

The present disclosure provides a fuel reformer that can reform fuel supplied to an internal combustion engine into easily vaporizable fuel so as to realize low fuel consumption and low emission.

An aspect of the present disclosure relates to a fuel reformer for a vehicle. The vehicle includes an internal combustion engine, a fuel tank in which fuel of the internal combustion engine is stored, and a fuel supply device configured to supply the fuel in the fuel tank to the internal combustion engine. The fuel reformer includes an irradiator configured to emit light from an irradiation portion. The irradiation portion is disposed at a position where the fuel stored in the fuel tank is irradiated with the light without the light passing through a gas phase region in the fuel tank.

According to the aspect of the present disclosure, the fuel stored in the fuel tank is irradiated with the light. Therefore, the total amount of light energy imparted to the fuel can be further increased. As a result, most of hydrocarbon having a relatively high molecular weight in the fuel can be reformed into hydrocarbon having a relatively low molecular weight. The hydrocarbon having a relatively low molecular weight is more likely to be vaporized than the hydrocarbon having a relatively high molecular weight. Further, the temperature of the fuel stored in the fuel tank can be further increased using the light energy. As a result, the possibility of stably supplying the fuel reformed into the easily vaporizable state to the internal combustion engine can be increased. Therefore, at least one of fuel consumption or emission can be further reduced.

On the other hand, in a case where the irradiation portion is provided at a position where the light is absorbed by gas (gas molecules of various components present in the gas phase region) in the fuel tank, the fuel reforming cannot be performed with high energy efficiency. On the other hand, according to the aspect of the present disclosure, the fuel is irradiated with the light without the light passing through the gas phase region in the fuel tank. Therefore, the fuel in the fuel tank absorbs the light energy before gas molecules present in the gas phase region. Accordingly, the light reaches the fuel without being absorbed by the gas molecules, and thus the fuel reforming can be performed with higher energy efficiency.

In the fuel reformer according to the aspect of the present disclosure, the irradiation portion may be disposed at a position on an upper surface of a bottom wall of the fuel tank, and the irradiation portion may be configured to emit the light to at least an upper region of the fuel tank.

According to the aspect of the present disclosure, the fuel in the fuel tank can be reliably irradiated with the light emitted from the irradiation portion without the light passing through the gas phase region in the fuel tank.

In the fuel reformer according to the aspect of the present disclosure, the irradiation portion may be disposed to configure a part or the entire area of a bottom wall of the fuel tank, and the irradiation portion may be configured to emit the light to at least an upper region of the fuel tank.

According to the aspect of the present disclosure, the fuel in the fuel tank can be reliably irradiated with the light emitted from the irradiation portion without the light passing through the gas phase region in the fuel tank. Further, according to the aspect of the present disclosure, the irradiation portion configures a part or the entire area of a bottom wall of the fuel tank. Therefore, an operation of providing the irradiation portion in the fuel tank can be omitted, and the number of components can be reduced.

In the fuel reformer according to the aspect of the present disclosure, the irradiation portion may be disposed at a position on a lower surface of a bottom wall of the fuel tank, the irradiation portion may be configured to emit the light to at least an upper region of the fuel tank, and at least a portion of the bottom wall of the fuel tank that is irradiated with the light may be formed of a material that allows transmission of light in a wavelength range of the light.

According to the aspect of the present disclosure, the fuel in the fuel tank can be reliably irradiated with the light emitted from the irradiation portion without the light passing through the gas phase region in the fuel tank. Further, according to the aspect of the present disclosure, the irradiation portion is not in contact with the fuel in the fuel tank. Therefore, at least one of the reliability or durability of the irradiation portion can be further improved.

In the fuel reformer according to the aspect of the present disclosure, the fuel tank may include a sub-tank that is disposed on an upper surface of a bottom wall of the fuel tank, the sub-tank may include an opening formed in an upper surface, the sub-tank may include a communication path formed in a side wall portion, and the irradiation portion may be disposed at a position where fuel in the sub-tank is irradiated with the light in a direction from a bottom side of the sub-tank to an upper region of the sub-tank (refer to FIG. 11).

In a case where the posture of the vehicle body changes by a motion (for example, quick turning, quick acceleration, or quick deceleration) of the vehicle such that "a rapid decrease in height from the bottom wall surface to the fuel level" occurs at a predetermined position of the fuel in the fuel tank, "the height from the bottom wall surface of the sub-tank to the fuel level" of the fuel in the sub-tank does not decrease significantly. According to the aspect of the present disclosure, even in this case, the fuel in the fuel tank can be reliably irradiated with the light emitted from the irradiation portion without the light passing through the gas phase region in the fuel tank.

In the fuel reformer according to the aspect of the present disclosure, the light emitted from the irradiation portion may be ultraviolet light.

In general, a wavelength of light and photon energy are in inverse proportion to each other. As a wavelength of light becomes short, photon energy increases. Accordingly, in a case where the light with which the fuel is irradiated is ultraviolet light having a relatively short wavelength, the photon energy can be further increased, and the amount of energy absorbed by the fuel can be increased. As a result, the fuel reforming and the increase in temperature can be further promoted.

Light having a short wavelength such as ultraviolet light is likely to be absorbed by oxygen molecules and is likely to change oxygen into ozone. Ozone is likely to absorb light having a short wavelength and is likely to cause corrosion of a device in the fuel tank. However, as described above, according to the aspect of the present disclosure, the fuel is irradiated with the light without the light passing through the gas phase region in the fuel tank. Therefore, the light is not absorbed by oxygen molecules in the fuel tank, and the amount of ozone produced in the fuel tank can be further reduced.

The fuel reformer according to the aspect of the present disclosure may further include: a remaining amount sensor configured to detect a remaining amount of the fuel stored in the fuel tank; and an electronic control unit configured to control the irradiator to emit the light from the irradiation portion in a case where the detected remaining amount of the fuel is a predetermined threshold or more and configured to control the irradiator to stop the emission of the light from the irradiation portion in a case where the detected remaining amount of the fuel is less than the threshold.

In a case where the light is continuously emitted from the irradiation portion in a state where the level height of the fuel over the irradiation portion is lowered by consumption of the fuel, the light is not sufficiently absorbed by the fuel and leaks from the liquid fuel to the gas phase region. As a result, the energy of the light emitted from the irradiation portion is wasted without contributing to the fuel reforming. Further, in a case where the light is light having a short wavelength such as ultraviolet light, ozone may increase in the fuel tank. Ozone adversely affects various members constituting the fuel tank. On the other hand, according to the aspect of the present disclosure, in a case where the level height of the fuel over the irradiation portion is lowered, the emission of the light is stopped. Therefore, the energy of the light is not wasted, and the production of ozone can be further suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Embodiment

Hereinafter, a fuel reformer (hereinafter, also referred to as "first device") of an internal combustion engine according to a first embodiment of the present disclosure will be described with reference to the drawings.

Configuration

Figure 1:
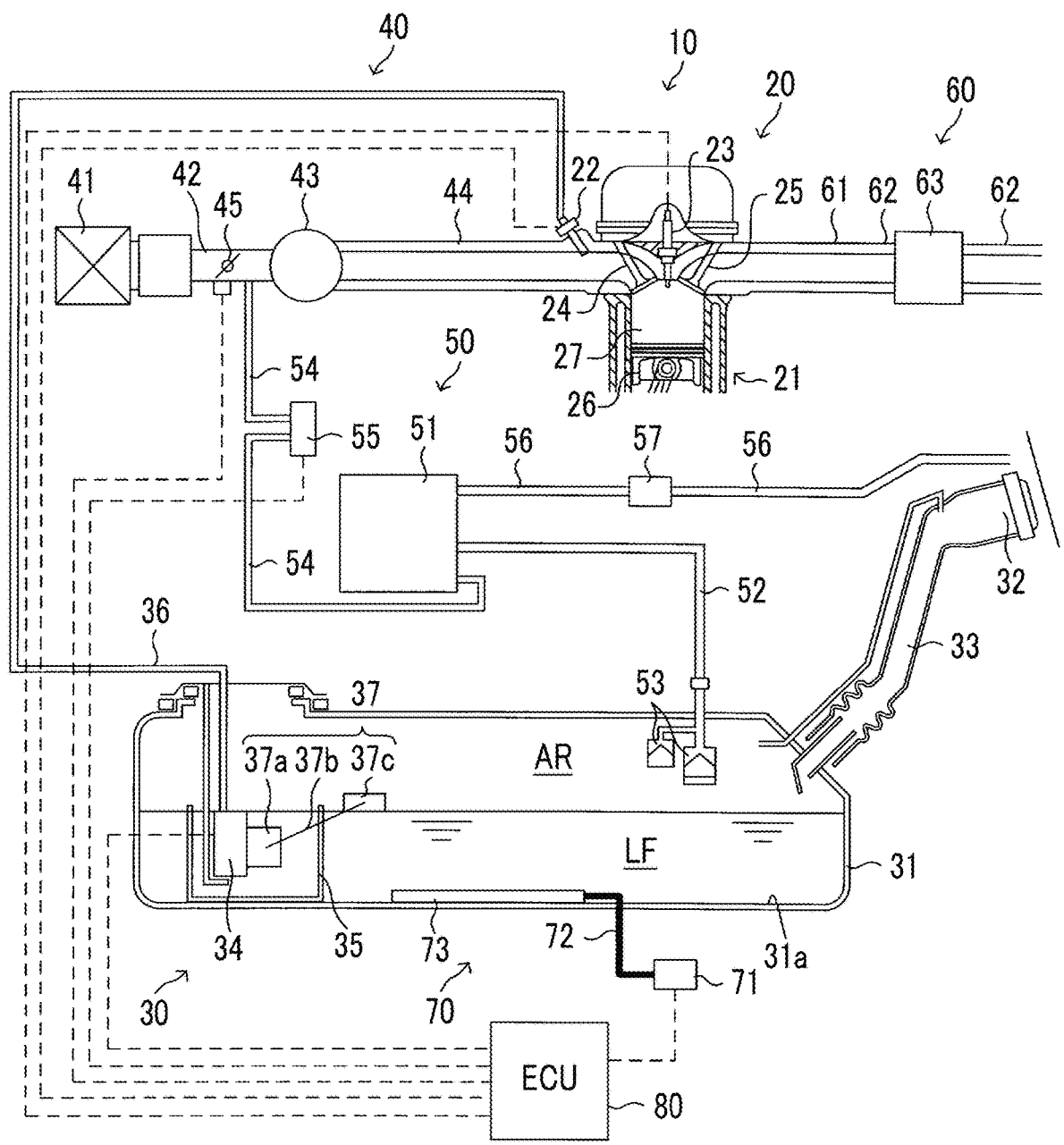
FIG. 1 is a diagram showing a schematic configuration of a fuel reformer for an internal combustion engine according to a first embodiment of the present disclosure.

The first device is applied to an internal combustion engine (engine) 10 shown in FIG. 1. The engine 10 is a gasoline, multi-cylinder, spark-ignition, four-cycle, reciprocating piston engine. The engine 10 includes an engine main body portion 20, a fuel supply system 30, an induction system 40, a vaporized fuel processing system 50, and an exhaust system 60.

The engine main body portion 20 includes a main body 21 including a cylinder block, a cylinder head, and a crankcase. The main body 21 includes a fuel injection valve 22, an ignition device 23, an intake valve 24, an exhaust valve 25, and a piston 26. In the main body 21, a combustion chamber 27 is formed.

The fuel supply system 30 includes a fuel tank 31, a fuel inlet 32, a refueling pipe 33, a fuel pump 34, a sub-tank 35, a fuel supply pipe 36, and a fuel level sensor 37.

The fuel tank 31 is formed of a synthetic resin, and is a substantially closed container for storing fuel (liquid gasoline fuel). A first end of the refueling pipe 33 is connected to an upper portion of the fuel tank 31. In a second end of the refueling pipe 33, the fuel inlet 32 including a fuel cap is provided. The fuel pump 34 is provided in the fuel tank 31, sucks fuel from a fuel intake port, pressurizes the fuel, and exhausts the fuel from a fuel exhaust port (not shown). The fuel pump 34 will also be referred to as "fuel supply device 34".

The sub-tank 35 is a container that has an opening formed in an upper surface. The sub-tank 35 is fixed to a bottom portion of the fuel tank 31 that is the inside of the fuel tank 31. The height of a side wall (vertical wall) of the sub-tank 35 is lower than that of the fuel tank 31. In a position below the center of the side wall (vertical wall) of the sub-tank 35, a through-hole (communication path; not shown) is formed. Fuel outside the sub-tank 35 or fuel in the sub-tank 35 can be caused to flow in and out through the through-hole. The fuel pump 34 is provided in the sub-tank 35. The fuel intake port of the fuel pump 34 is provided in the vicinity of the bottom portion of the sub-tank 35. In the sub-tank 35, the fuel pump 34 can suck fuel even in a case where the remaining amount of fuel in the fuel tank 31 is relatively small, a vehicle body is inclined, or an acceleration or deceleration rate or a centrifugal acceleration is generated.

The fuel supply pipe 36 communicates with the fuel exhaust port of the fuel pump 34 and the fuel injection valve 22. As a result, the fuel pump 34 is driven so as to supply fuel to the fuel injection valve 22.

The fuel level sensor 37 is attached to the fuel pump 34 and detects a level height HL of fuel stored in the fuel tank 31. The fuel level sensor 37 includes a gauge main body 37a, an arm portion 37b, and a float 37c. The arm portion 37b is connected to the gauge main body 37a and the float 37c. The arm portion 37b is provided to be rotatable around the gauge main body 37a. The float 37c floats on the liquid surface of liquid fuel LF stored in the fuel tank 31 that is positioned outside the sub-tank 35. Accordingly, a position of the float 37c is determined based on the amount of the liquid fuel, that is, the level height of the fuel. Further, a rotation angle of the arm portion 37b is determined based on the position of the float 37c. An electrical resistance value of a sensor portion provided in the gauge main body 37a is determined based on the rotation angle of the arm portion 37b. An ECU 80 described below obtains the resistance value so as to detect the level height HL of the fuel LF (that is, the remaining amount of the fuel). The fuel level sensor 37 will also be referred to as "sender gauge 37" or "remaining amount sensor 37" of the fuel.

Figure 2:
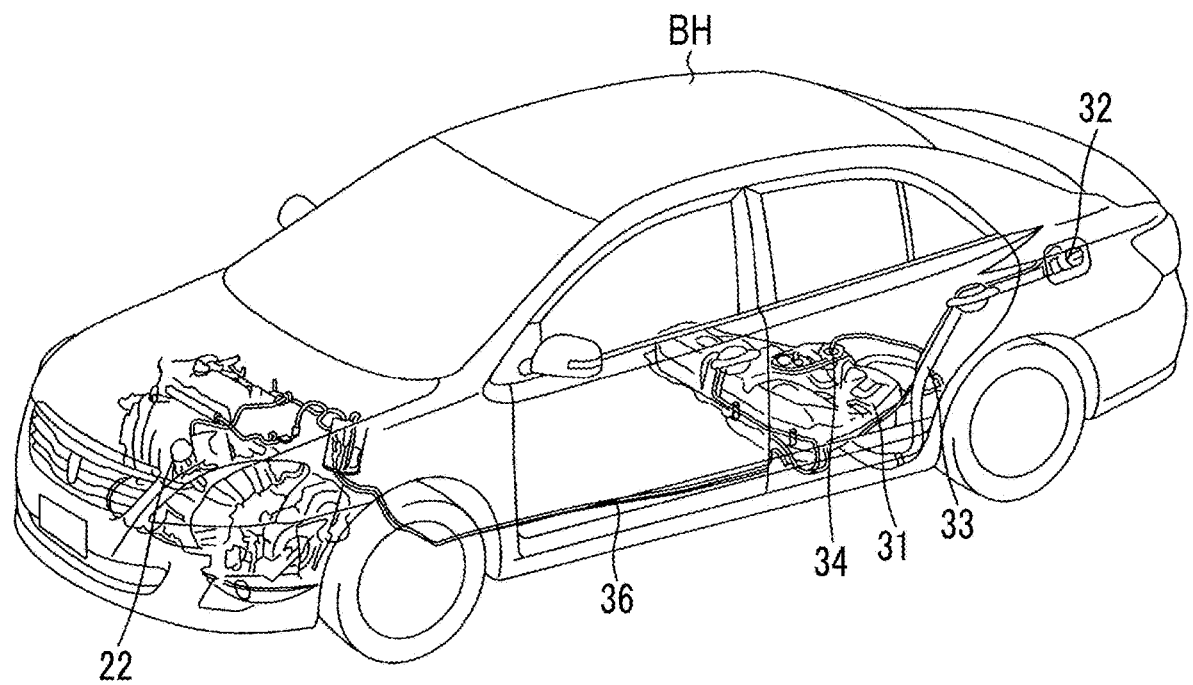
FIG. 2 is a perspective view showing a shape of a fuel tank shown in FIG. 1 and disposition thereof in a vehicle.

As shown in FIG. 2, the fuel tank 31 is provided under a relatively rear floor of a vehicle BH. The fuel is supplied from the fuel inlet 32 provided in a rear region of the vehicle BH to the fuel tank 31 through the refueling pipe 33. The fuel stored in the fuel tank 31 is sucked by the fuel pump 34, and is supplied to the fuel injection valve 22 provided in a front region of the vehicle BH through the fuel supply pipe 36. As described above, the fuel tank 31 has a container shape having a relatively large bottom surface area and a low height in order to secure a needed storage capacity of the fuel using an underfloor space.

Referring to FIG. 1 again, the induction system 40 includes an air filter 41, an intake pipe 42, a surge tank 43, and an intake manifold 44 in order from the intake upstream side. In the intake pipe 42, a throttle valve 45 is provided. The fuel injection valve 22 is provided between the intake manifold 44 and the main body 21, that is, in an intake port. The fuel injection valve 22 is a port injection valve, but may be a cylinder injection valve that directly injects the fuel into the combustion chamber 27.

The vaporized fuel processing system 50 includes a canister 51, a vapor pipe 52, a roll-over valve 53, a purge pipe 54, a purge control valve 55, an atmosphere introduction pipe 56, and an atmospheric dust filter 57.

The canister 51 includes: a cylindrical container that is formed of a metal or a synthetic resin; and an adsorbing material (in the example, activated carbon) that is filled into the container. The canister 51 causes fuel vapor generated in the fuel tank 31 to adsorb on the adsorbing material so as to restrain the vaporized fuel from being emitted to the atmosphere.

A first end (downstream end) of the vapor pipe 52 is connected to the canister 51. The roll-over valve 53 is attached to a second end (upstream end) of the vapor pipe 52, and the second end of the vapor pipe 52 is positioned in the vicinity of the uppermost portion of the fuel tank 31. The vapor pipe 52 configures a path through which vaporized fuel generated in the fuel tank 31 is introduced into the canister 51. The roll-over valve 53 restrains the liquid fuel LF from penetrating into the vapor pipe 52.

A first end of the purge pipe 54 is connected to the canister 51. A second end of the purge pipe 54 is connected to an upstream side portion of the surge tank 43 that is positioned on the downstream side of the throttle valve 45 of the intake pipe 42. The purge control valve 55 is provided in the purge pipe 54. The amount of the vaporized fuel supplied to the intake pipe 42 is regulated by the purge control valve 55. A first end of the atmosphere introduction pipe 56 is connected to the canister 51. A second end of the atmosphere introduction pipe 56 is open to the atmosphere. The atmospheric dust filter 57 is provided in the atmosphere introduction pipe 56.

The exhaust system 60 includes an exhaust manifold 61, an exhaust pipe 62, and an exhaust gas purification catalyst 63 in order from the exhaust upstream side. The exhaust system 60 exhausts exhaust gas produced in the combustion chamber 27.

The first device includes an irradiator 70. The irradiator 70 includes a light source main body 71, a light guide portion 72, and an irradiation portion 73.

Figure 3:
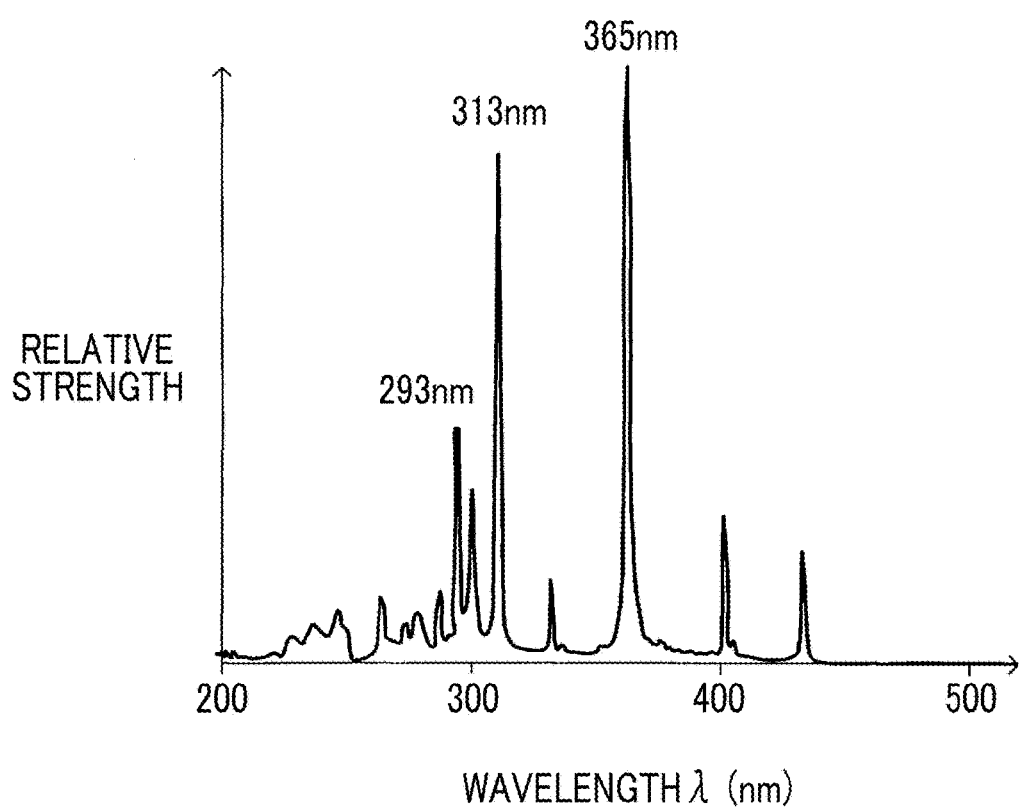
FIG. 3 is a graph showing a wavelength spectrum of a light source of the fuel reformer shown in FIG. 1.

The light source main body 71 includes an ultraviolet light (ultraviolet ray) lamp (not shown; hereinafter also referred to as "UV lamp"). The light source main body 71 generates (emits) ultraviolet light when electric power is supplied thereto. The ultraviolet light generated by the UV lamp has several peaks in a wavelength range of 200 nm to 400 nm on the wavelength spectrum. Representative peak wavelengths of the UV lamp are 293 nm, 313 nm, and 365 nm as shown in FIG. 3.

Referring to FIG. 1 again, the light guide portion 72 is formed of a medium (in the example, optical fiber) that transmits light with high efficiency. The light guide portion 72 transmits ultraviolet light exiting from the light source main body 71 to the irradiation portion 73.

The irradiation portion 73 is provided substantially at the center of an upper surface 31a of a bottom wall of the fuel tank 31. The irradiation portion 73 emits (radiates) the ultraviolet light transmitted from the light guide portion 72 toward the fuel LF present over the irradiation portion 73.

The ECU 80 is an electronic circuit including a well-known microcomputer, and includes, a CPU, a ROM, a RAM, a backup RAM (static RAM or nonvolatile memory), and an interface. The ECU is an abbreviation for an electronic control unit. The CPU executes various functions described below by executing instructions (routines) stored in the memory (ROM).

The ECU 80 is electrically connected to the fuel injection valve 22, the ignition device 23, the fuel pump 34, the purge control valve 55, the light source main body 71, and the like, and transmits instruction signals (driving signals) thereto. Further, the ECU 80 is electrically connected to the fuel level sensor 37, an ignition key switch (not shown), and the like, and receives a signal from the sensor and the like.

Figure 4:
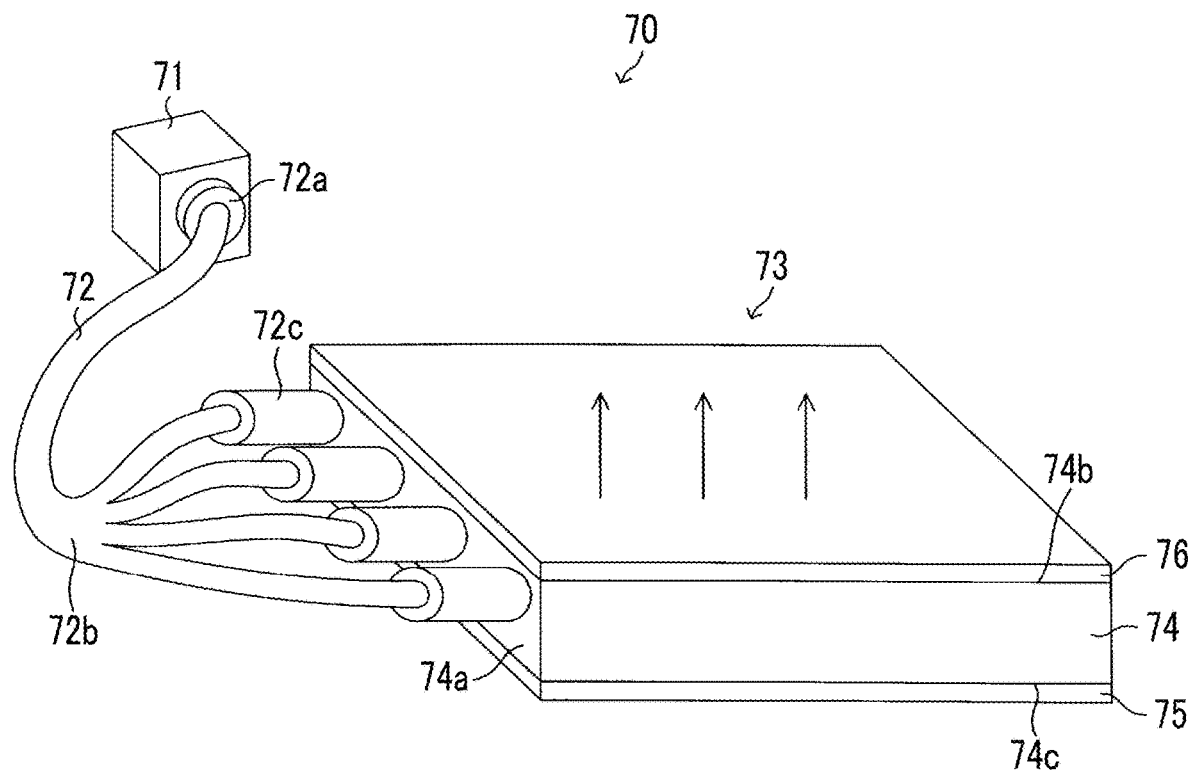
FIG. 4 is a perspective view showing an irradiator of the fuel reformer shown in FIG. 1.

The irradiator 70 will be described in detail with reference to FIG. 4. The irradiation portion 73 has a thin plate shape and includes a light guide plate 74, a reflection plate 75, and a diffusion plate 76. The light guide plate 74 is laminated on an upper surface of the reflection plate 75, and the diffusion plate 76 is laminated on an upper surface of the light guide plate 74. A lower surface of the reflection plate 75 is fixed to the upper surface (bottom surface) 31a of the bottom wall of the fuel tank 31 shown in FIG. 1.

A first end (incident end 72a) of the light guide portion 72 is connected to the light source main body 71. The light guide portion 72 is branched into a plurality of light guides (in the example, four light guides) at a branch portion 72b in a region from the first end to second ends (exit ends 72c). A plurality of second ends (exit ends 72c) of the light guide portion 72 is connected at intervals to an end surface 74a of the light guide plate 74 of the irradiation portion 73. The light guide portion 72 transmits the ultraviolet light, which exits from the UV lamp of the light source main body 71, from the incident end 72a to the exit ends 72c, and the transmitted ultraviolet light exits from the end surface 74a of the light guide plate 74 to the inside of the light guide plate 74.

An upper surface of the light guide plate 74 (that is, a surface in contact with a lower surface of the diffusion plate 76) will be referred to as "first main surface 74b". The first main surface 74b is a smooth flat surface. The light guide plate 74 can uniformly diffuse the ultraviolet light incident from the end surface 74a into the light guide plate 74 and can emit the diffused ultraviolet light from the first main surface 74b. A lower surface of the light guide plate 74 (that is, a surface in contact with the upper surface of the reflection plate 75) will be referred to as "second main surface 74c". The second main surface 74c is a surface where a plurality of reflecting protrusions (reflecting dots) is formed.

The upper surface of the reflection plate 75 (a surface in contact with the second main surface 74c) is mirror-finished. The reflection plate 75 reflects light, which leaks from the second main surface 74c, to the first main surface 74b. An upper surface of the diffusion plate 76 (a surface opposite to the first main surface 74b) is roughened. As a result, the diffusion plate 76 diffuses the ultraviolet light emitted from the first main surface 74b. The light guide portion 72 and the irradiation portion 73 are waterproofed.

Effect

As described above, the irradiation portion 73 is attached to the bottom surface 31a of the fuel tank 31, and irradiates the ultraviolet light from the vicinity of the bottom surface 31a to the fuel LF present over the irradiation portion 73. Due to the irradiation of the fuel LF with ultraviolet light, hydrocarbon having a relatively high molecular weight in the fuel LF can be reformed into hydrocarbon having a relatively low molecular weight that is easily vaporizable. Further, the temperature of the fuel LF can be further increased. As a result, fuel injected from the fuel injection valve 22 can be changed (reformed) into easily vaporizable fuel. Accordingly, the first device can further improve ignition performance of fuel and can further reduce the amount of unburned components produced. The amount of deposits produced can be further reduced, deterioration of emission can be further suppressed, and fuel consumption can be further reduced.

However, in the first device, the irradiation portion 73 is provided on the bottom surface 31a of the fuel tank 31, and the ultraviolet light is emitted upward from the vicinity of the bottom surface 31a. The reason for this is as follows.

Not only ultraviolet light but also other light components are absorbed by gas including various components in the atmosphere. In particular, ultraviolet light is likely to be absorbed by nitrogen molecules $N_2$ and oxygen molecules $O_2$ in the atmosphere. Nitrogen molecules $N_2$ have characteristics of absorbing ultraviolet rays having a wavelength of 100 nm or less, and oxygen molecules $O_2$ have characteristics of absorbing ultraviolet rays having a wavelength range of 100 nm to 240 nm. It can be said that a light source having a wavelength of 100 nm or shorter is not practically present. Therefore, there is no need to take absorption of ultraviolet rays by nitrogen molecules $N_2$ into consideration.

However, each oxygen molecule $O_2$ is broken down into two oxygen atoms O when absorbing ultraviolet light having a wavelength of 240 nm or less. The oxygen atoms O combine with a surrounding oxygen molecule $O_2$. As a result, an ozone molecule $O_3$ is produced. Further, the produced ozone molecule $O_3$ contributes to absorption of ultraviolet light. A wavelength range of light absorbed by the ozone molecule $O_3$ is 200 nm to 300 nm.

Accordingly, even in a case where ultraviolet light is irradiated from an upper region of the fuel tank 31 to the fuel LF in the fuel tank 31, most of the ultraviolet light is absorbed by producing ozone molecules $O_3$ with oxygen molecules $O_2$ that are present in a gas phase region (atmosphere) AR present between the irradiation portion 73 and the fuel level. Accordingly, the fuel is not efficiently irradiated with the ultraviolet light irradiated from the irradiation portion 73. Accordingly, the produced ozone molecules $O_3$ may cause corrosion of the components such as the fuel tank 31 and the fuel pump 34.

As shown in FIG. 1, the irradiation portion 73 of the first device is disposed on the bottom surface 31a of the fuel tank 31 such that the gas phase region AR in the fuel tank 31 is not irradiated with the ultraviolet light. As a result, the fuel LF stored in the fuel tank 31 is efficiently irradiated with the ultraviolet light irradiated from the irradiation portion 73 without the ultraviolet light being absorbed by the oxygen molecules $O_2$ in the fuel tank.

In a case where the amount of the fuel LF stored in the fuel tank 31 is relatively reduced and the level of the fuel LF is lowered, the ultraviolet light irradiated from the irradiation portion 73 passes through the fuel LF and reaches the gas phase region AR. As a result, ozone molecules $O_3$ are produced in the fuel tank 31. In the first device, in a case where the level of the fuel LF is lowered by consumption of the fuel LF, the irradiation of the fuel LF with ultraviolet light is stopped. In the first device, in a case where the level of the fuel LF rises by the supply of the fuel, the irradiation of ultraviolet light starts again.

Figure 5:
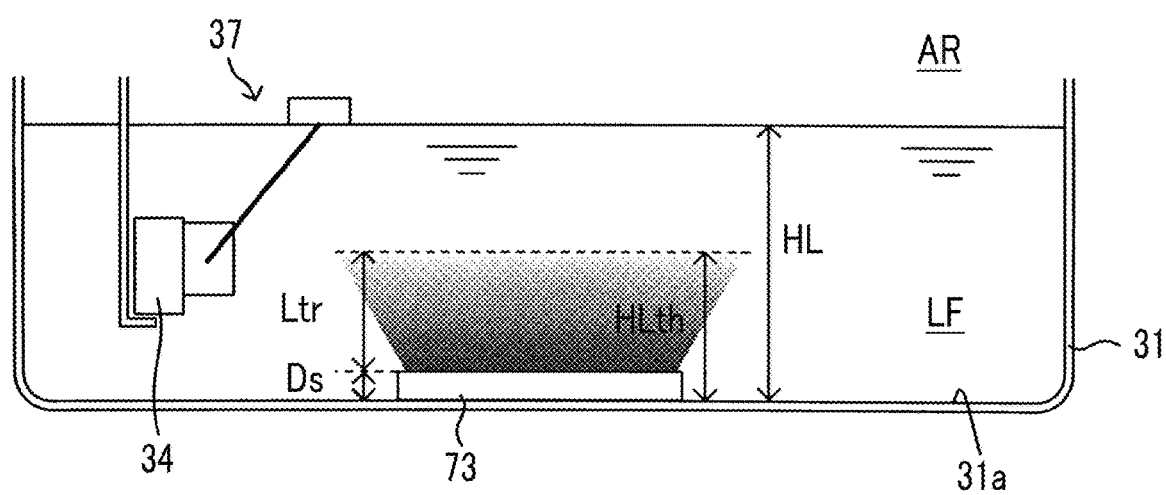
FIG. 5 is a diagram showing a positional relationship between fuel stored in the fuel tank shown in FIG. 1 and an irradiation portion of the fuel reformer.

More specifically, as shown in FIG. 5, in the first device, in a case where the level height HL of the fuel in the fuel tank 31 is higher than a level height threshold HLth, the irradiation of ultraviolet light is performed. In a case where the level height HL of the fuel in the fuel tank 31 is the level height threshold HLth or lower, the irradiation of ultraviolet light is stopped. The level height threshold HLth is set as the sum (Ltr+Ds) of a transmission distance Ltr in fuel and a thickness Ds of the irradiation portion 73. The transmission distance Ltr in fuel is set based on the attenuation of an ultraviolet light output in the liquid fuel. For example, the distance in which the light output of the ultraviolet light with which the liquid fuel is irradiated is attenuated by 20 dB is defined as the transmission distance Ltr in fuel.

Specific Operation

Hereinafter, an actual operation of the first device will be described with reference to FIG. 6.

Light Irradiation Control

Figure 6:
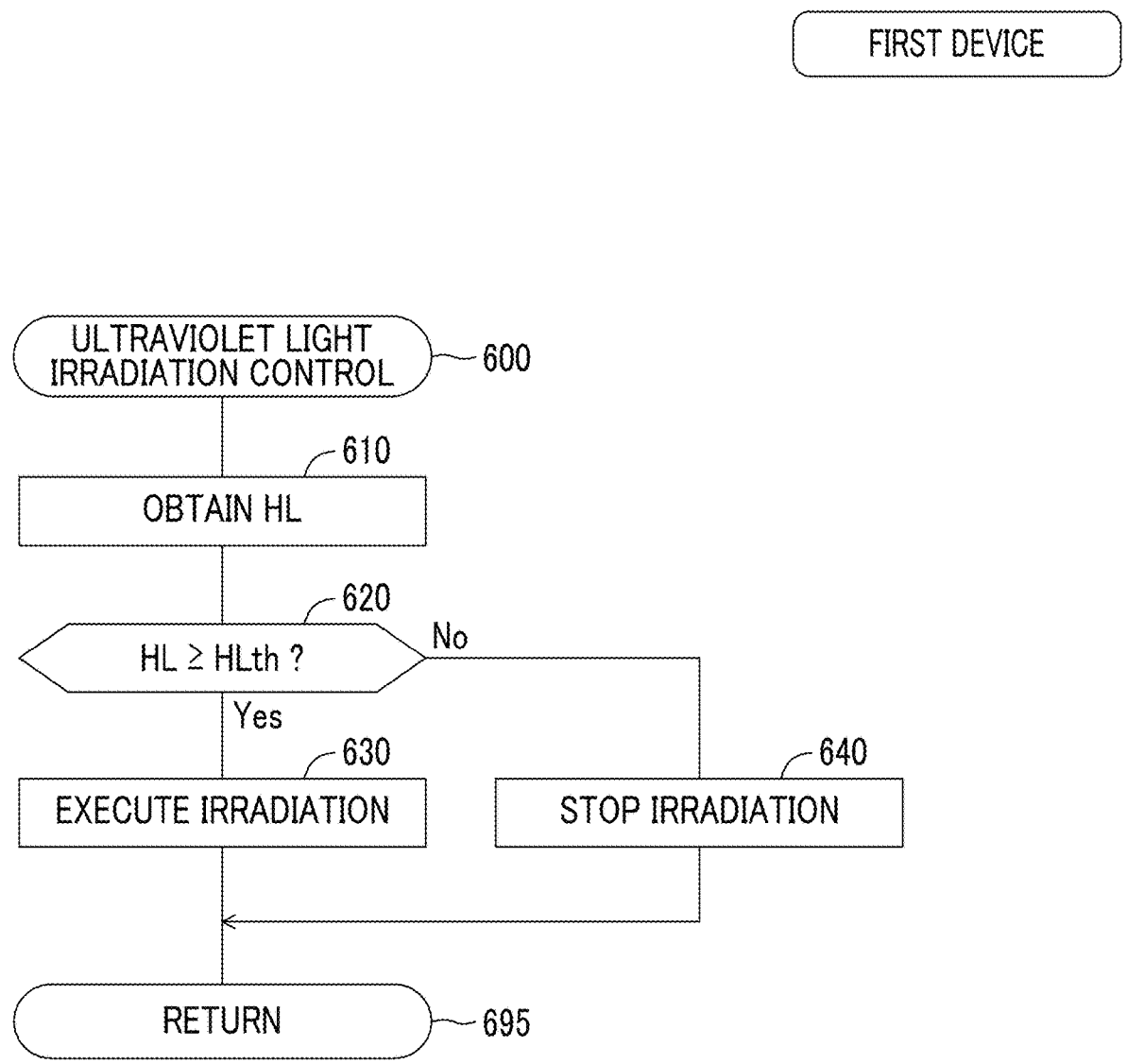
FIG. 6 is a flowchart showing "light irradiation control routine" that is executed by a CPU of an ECU of the fuel reformer shown in FIG. 1.

In a case where the ignition key switch is positioned at an ON-position, the CPU of the ECU 80 executes a light irradiation control routine shown in a flowchart of FIG. 6 every predetermined period of time. In a case where the ignition key switch is switched from an OFF-position to the ON-position, the CPU causes the irradiator 70 to start the irradiation of ultraviolet light according to an initial routine that is separately performed. Further, in a case where the ignition key switch is switched from the ON-position to the OFF-position, the CPU causes the irradiator 70 to stop the irradiation of ultraviolet light.

At a predetermined time point, the CPU starts processing in Step 600, proceeds to Step 610, and obtains the level height HL of the fuel in the fuel tank 31 using the fuel level sensor 37. Next, the CPU proceeds to Step 620, and determines whether or not the level height HL is the level height threshold HLth or higher.

In a case where the level height HL is the level height threshold HLth or higher, the CPU determines "Yes" in Step 620, proceeds to Step 630, and transmits an instruction signal to the light source main body 71 so as to supply electric power from a battery (not shown) to the light source main body 71. That is, in Step 630, the CPU starts (executes) the irradiation of the fuel LF with ultraviolet light, proceeds to Step 695, and temporarily ends the routine.

On the other hand, in a case where the level height HL is lower than the level height threshold HLth, the CPU determines "No" in Step 620, proceeds to Step 640, and stops the supply of electric power to the light source main body 71 to stop the irradiation of ultraviolet light to the fuel LF. Next, the CPU proceeds to Step 695 and temporarily ends the routine.

Effect of Irradiation of Fuel with Ultraviolet Light

Next, the effect of the first device will be described. With the first device, (1) a reduction in molecular weight of fuel and (2) an increase in temperature of fuel are expected due to the irradiation of the liquid fuel stored in the fuel tank 31 with ultraviolet light.

(1) Reduction in Molecular Weight of Fuel

By irradiating the liquid fuel with ultraviolet light having a relatively high photon energy, the molecular weight of hydrocarbon in the fuel can be further reduced. Hereinafter, among hydrocarbons in the fuel, hydrocarbon having a relatively low molecular weight will be referred to as "light hydrocarbon", and hydrocarbon having a relatively high molecular weight will be referred to as "heavy hydrocarbon". For example, in a case where the proportion of the light hydrocarbon among the hydrocarbons in the fuel is increased by the fuel reforming, this increase can be expressed as "the reduction in molecular weight" of fuel.

In general, a wavelength of light and photon energy are in inverse proportion to each other. As a wavelength of light becomes short, photon energy increases. On the other hand, liquid fuel such as light oil or gasoline includes many kinds of hydrocarbons having different structures and different molecular weights. In a case where the molecular weight of hydrocarbons composing light oil is compared to that of hydrocarbons composing gasoline, the average molecular weight of hydrocarbons composing light oil is higher than that of hydrocarbons composing gasoline.

Hydrocarbon molecular bonds include a C—C single bond, a C=C double bond, and a C—H bond, and each of the bonds has an intrinsic binding energy. For example, the binding energy of a C—C single bond is 84.3 kcal/mol, the binding energy of a C=C double bond is 140.5 kcal/mol, and the binding energy of a C—H bond is 97.6 kcal/mol. In general, it is said that a photon energy higher than a molecular binding energy is needed in order to break down a molecule. Further, it is said that the excited state of a molecule is needed to have a dissociation potential in order to break down the molecule, and the breakdown efficiency of a molecule depends on light absorption characteristics of fuel to be irradiated with light.

Accordingly, for example, in a case where fuel is irradiated with ultraviolet light having a wavelength of 172 nm, a C—C single bond, a C=C double bond, and a C—H bond having a lower molecular binding energy than the photon energy (166.2 kcal/mol) of the ultraviolet light having a wavelength of 172 nm may dissociate. On the other hand, in a case where fuel is irradiated with ultraviolet light having a wavelength of 254 nm, a C—C single bond and a C—H bond having a lower molecular binding energy than the photon energy (112.6 kcal/mol) of the ultraviolet light having a wavelength of 254 nm may dissociate, but a C=C double bond having a higher molecular binding energy than the photon energy of the ultraviolet light having a wavelength of 254 nm does not dissociate.

The result of investigating the effect of the reduction in molecular weight of liquid fuel (light oil) obtained by irradiation of ultraviolet light using commercially available light oil will be described.

Using a spectrometer, the present inventors analyzed a change in the molecular weight of hydrocarbons included in a sample (volume: 3 ml) of light oil before and after irradiation of ultraviolet light. Specifically, among the hydrocarbons included in the sample of light oil, the proportions of three groups of hydrocarbons including (A) linear hydrocarbon having 9 to 13 carbon atoms, (B) linear hydrocarbon having 14 to 18 carbon atoms, and (C) linear hydrocarbon having 19 to 23 carbon atoms were analyzed. Hereinafter, for convenience of description, the linear hydrocarbon having 9 to 13 carbon atoms is defined as "light hydrocarbon", and the linear hydrocarbon having 19 to 23 carbon atoms is defined as "heavy hydrocarbon". Ultraviolet light was light emitted from a UV xenon lamp (output: 412 mW), and the irradiation time was 20 minutes.

Figure 7:
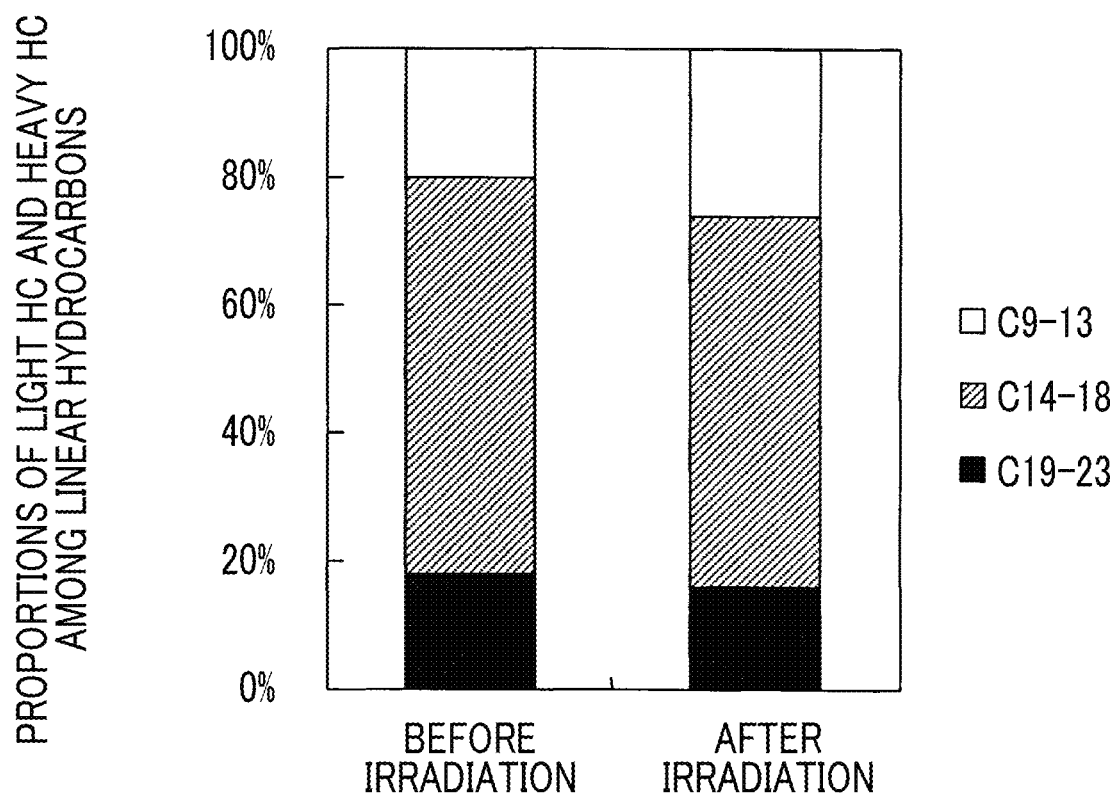
FIG. 7 is a graph showing an effect of fuel reforming of the fuel reformer shown in FIG. 1.

As a result, as can be seen from FIG. 7, it was found that, after the irradiation of the light, the proportion of the light hydrocarbon increased and the proportion of the heavy hydrocarbon decreased (the reduction in molecular weight was realized). It is considered that ultraviolet light having a wavelength of 293 nm that has a higher photon energy than the binding energy of a C—C single bond and a C—H bond among peak wavelengths of the light source contributed to the reduction in molecular weight of the fuel. The result was obtained from the linear hydrocarbon, but the same effect of the reduction in molecular weight may be obtained from an isomer other than the linear hydrocarbon. As described above, in a case where the reduction in molecular weight is realized by dissociation of an intermolecular bond of hydrocarbon, it can be said that this dissociation is a kind of fuel reforming.

(2) Increase in Temperature of Fuel

By irradiating liquid fuel with ultraviolet light, the temperature of fuel can be increased. It is considered that ultraviolet light can impart photon energy that is insufficient for dissociation of an intermolecular bond but is sufficient for vibrating molecules in the liquid fuel to generate heat.

The result of investing the effect of the increase in temperature of liquid fuel obtained by irradiation of ultraviolet light will be described. The present inventors evaluated an increase in temperature of liquid fuel obtained by irradiation of ultraviolet light using commercially available light oil, gasoline, water, and ethanol. In a case where the fuels were irradiated with the light under the same conditions as those of the investigation described above regarding the reduction in molecular weight of fuel, the temperatures of the light oil and the gasoline were increased at a rate of about 2° C./min on average. Hereinafter, the rate at which the temperature increases will also be referred to as "temperature increase rate". On the other hand, the average temperature increase rate of the water was 0.2° C./min, and the average temperature increase rate of the ethanol was 0.4° C./min.

The difference in temperature increase rate may have a correlation with the energy (109.3 kcal/mol) of an O—H bond of a water molecule $H_2O$, the energy (97.6 kcal/mol) of a C—H bond that is a main bond of ethanol $C_2H_5OH$, and the energy (84.3 kcal/mol) of a C—C bond that is a main bond of the fuel.

As described above, it was verified that the irradiation of the liquid fuel (light oil and gasoline) with ultraviolet light is effective for increasing the temperature of the fuel.

As described above, with the first device, by irradiating the fuel LF in the fuel tank 31 with ultraviolet light without the ultraviolet light passing through the gas phase region, the ultraviolet light can be efficiently absorbed by the fuel without being absorbed by gas molecules (in particular, oxygen molecules) present in the gas phase region. Accordingly, hydrocarbon having a relatively high molecular weight in the fuel can be reformed into hydrocarbon having a relatively low molecular weight while further reducing the amount of ozone produced, and the temperature of the fuel can be further increased. As a result, the vaporization of the fuel injected into the internal combustion engine 10 is promoted, and the reduction of fuel consumption and emission can be realized.

Further, with the first device, in a case where the remaining amount HL of the fuel LF in the fuel tank 31 is the predetermined threshold HLth or less, the irradiation of the fuel LF with ultraviolet light is stopped. As a result, the ultraviolet light can be restrained from leaking from the liquid fuel to the gas phase region, and the amount of ozone produced can be further reduced.

Second Embodiment

Figure 8:
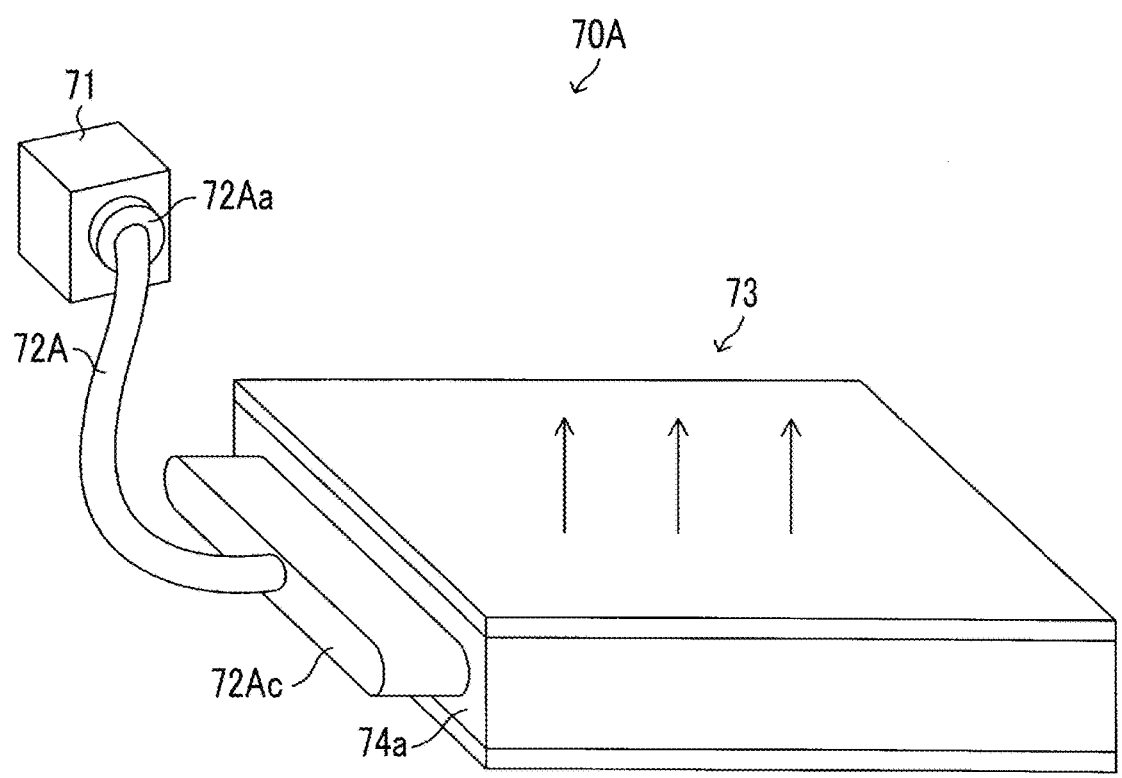
FIG. 8 is a perspective view showing an irradiator of a fuel reformer for an internal combustion engine according to a second embodiment of the present disclosure.

A fuel reformer (hereinafter, also referred to as "second device") of an internal combustion engine according to a second embodiment is different from the first device solely in that a line light guide portion 72A is used instead of the light guide portion 72 as shown in FIG. 8.

In the line light guide portion 72A, a plurality of optical fibers is bundled such that an incident end surface shape of an incident end 72Aa opposite to the light source main body 71 is circular, and is disposed such that an exit end surface shape of an exit end 72Ac is linear in a longitudinal direction of an opening. As a result, light exiting from the light source main body 71 is converted into line light in the exit end 72Ac attached to the end surface 74a of the light guide plate 74, and the line light exits to the light guide plate 74. The line light guide portion 72A is, for example, a well-known line light guide described in Japanese Unexamined Patent Application Publication No. 2008-209202 (JP 2008-209202 A) and Japanese Unexamined Patent Application Publication No. 2008-209611 (JP 2008-209611 A).

Third Embodiment

A fuel reformer (hereinafter, also referred to as "third device") of an internal combustion engine according to a third embodiment is different from the first device solely in that the bottom portion (bottom wall) of the fuel tank is configured using a light guide plate.

Figure 9:
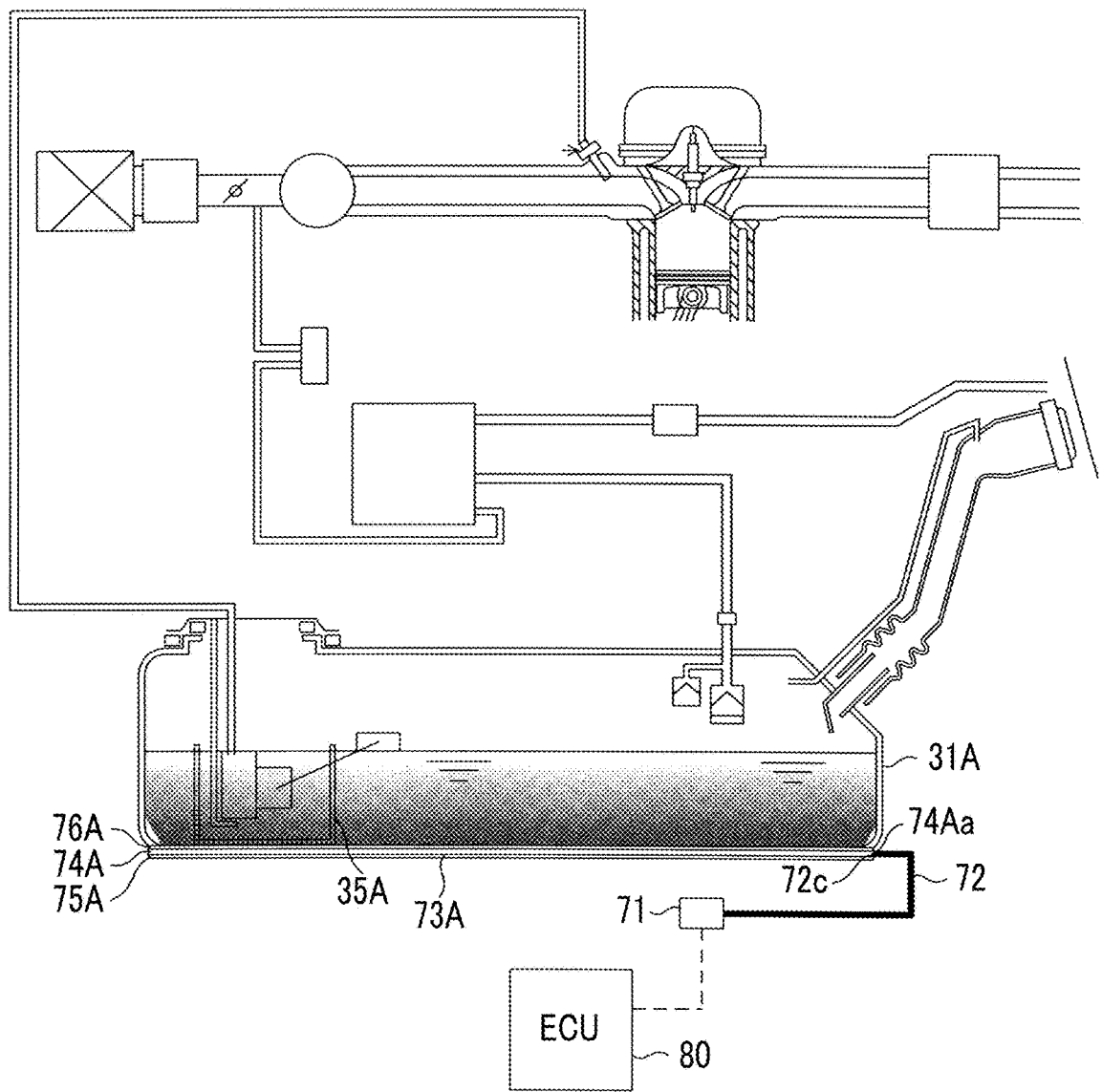
FIG. 9 is a schematic diagram showing a structure of an irradiation portion of a fuel reformer for an internal combustion engine according to a third embodiment of the present disclosure.

More specifically, as shown in FIG. 9, the third device includes a fuel tank 31A instead of the fuel tank 31. In the fuel tank 31A, the bottom wall (bottom plate) of the fuel tank 31 is replaced with an irradiation portion 73A. That is, the irradiation portion 73A also functions as the bottom plate of the fuel tank 31A.

The irradiation portion 73A includes a light guide plate 74A, a reflection plate 75A, and a diffusion plate 76A. Functions of the light guide plate 74A, the reflection plate 75A, and the diffusion plate 76A are the same as those of the light guide plate 74, the reflection plate 75, and the diffusion plate 76. The light guide plate 74A is laminated on an upper surface of the reflection plate 75A, and the diffusion plate 76A is laminated on an upper surface of the light guide plate 74A. A plurality of exit ends 72c of the light guide portion 72 is connected at intervals to an end surface 74Aa of the light guide plate 74A. The light guide plate 74A is laminated on an upper surface of the reflection plate 75A, and the diffusion plate 76A is laminated on an upper surface of the light guide plate 74A.

Further, the third device includes a sub-tank 35A instead of the sub-tank 35. The sub-tank 35A is different from the sub-tank 35 solely in that at least a bottom wall of the sub-tank 35A is formed of "material that allows transmission of light in a wavelength range of ultraviolet light (for example, an acrylic resin or a polycarbonate resin)".

In the third device, the bottom wall of the fuel tank 31A is the irradiation portion 73A. Therefore, the entire area of the fuel stored in the fuel tank 31A can be irradiated with ultraviolet light. Accordingly, the entire area of the fuel stored in the fuel tank 31A can be uniformly reformed.

In the third device, solely a portion (for example, a region in the vicinity of a center portion) of the bottom wall of the fuel tank 31A may be configured using the irradiation portion 73A, and the remaining portion of the bottom wall of the fuel tank 31A may be configured using a plate body formed of the same material as that of the bottom wall of the fuel tank 31.

Fourth Embodiment

A fuel reformer (hereinafter, also referred to as "fourth device") of an internal combustion engine according to a fourth embodiment is different from the first device solely in that the bottom wall (bottom plate) of the fuel tank is formed of "material that allows transmission of ultraviolet light" and that the irradiation portion is provided on a lower surface of the bottom wall of the fuel tank.

Figure 10:
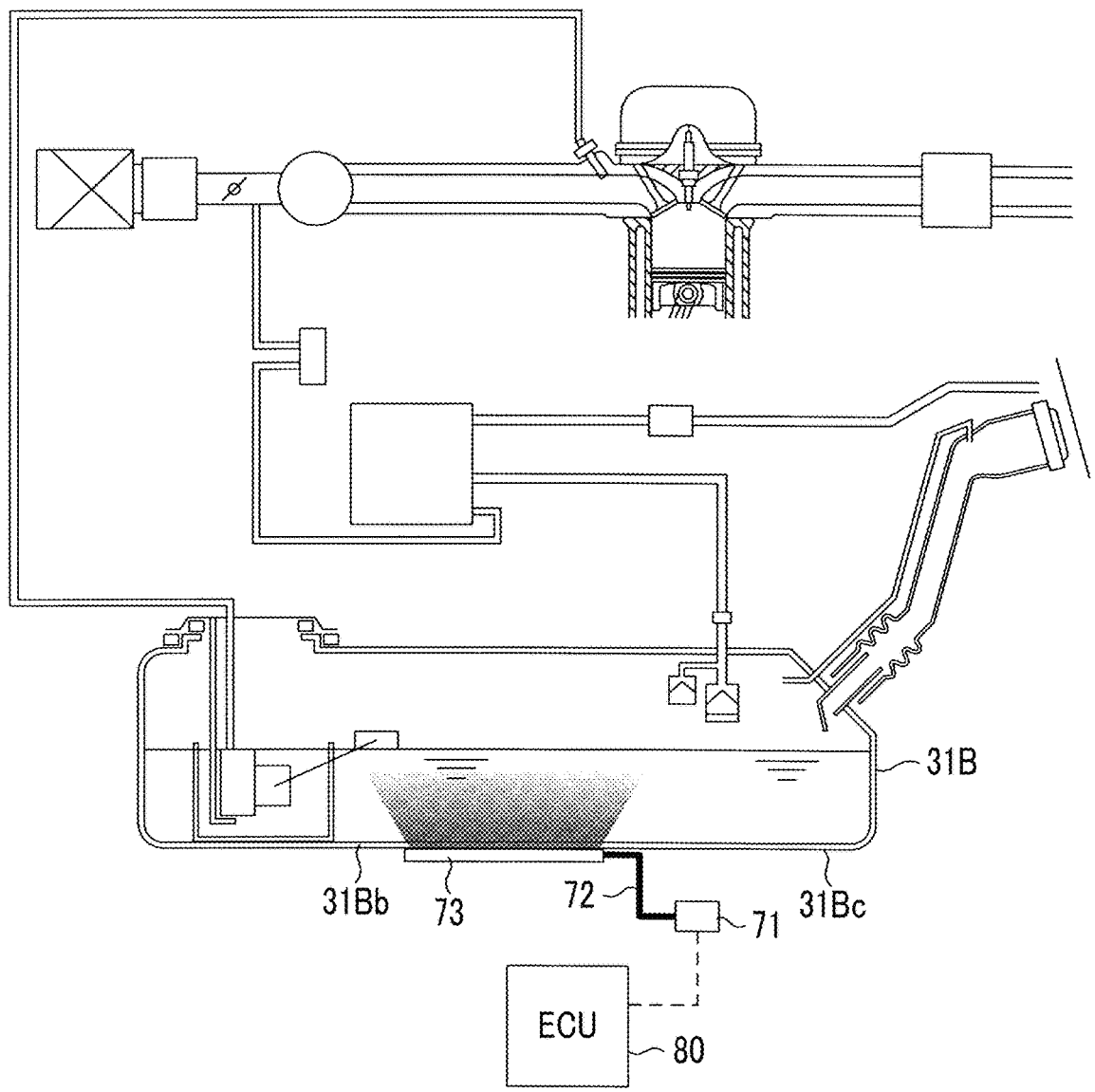
FIG. 10 is a schematic diagram showing an attachment position of an irradiation portion of a fuel reformer for an internal combustion engine according to a fourth embodiment of the present disclosure.

More specifically, as shown in FIG. 10, the irradiation portion 73 of the fourth device is attached to a lower surface 31Bc of a bottom plate 31Bb of a fuel tank 31B, which is used instead of the fuel tank 31, so as to emit ultraviolet light upward. Further, at least the bottom plate 31Bb is formed of "material that allows transmission of light in a wavelength range of ultraviolet light (for example, an acrylic resin or a polycarbonate resin)". In the bottom plate 31Bb, a portion corresponding to an upper region of the irradiation portion 73 (that is, a portion that is irradiated with the ultraviolet light emitted from irradiation portion 73) may be formed of "material that allows transmission of light in a wavelength range of ultraviolet light", and the remaining portion may be formed of a typical material constituting the bottom plate of the fuel tank 31.

In the fourth device, there is no need to provide the irradiation portion 73 in the fuel tank 31B (the liquid fuel LF). Accordingly, the irradiation portion 73 can be easily provided. Further, for example, penetration of the fuel into the irradiation portion 73 and penetration of the fuel into a connection portion between the irradiation portion 73 and the exit end 72c do not occur. Therefore, the fuel reformer having higher reliability and durability can be provided.

Fifth Embodiment

Figure 11:
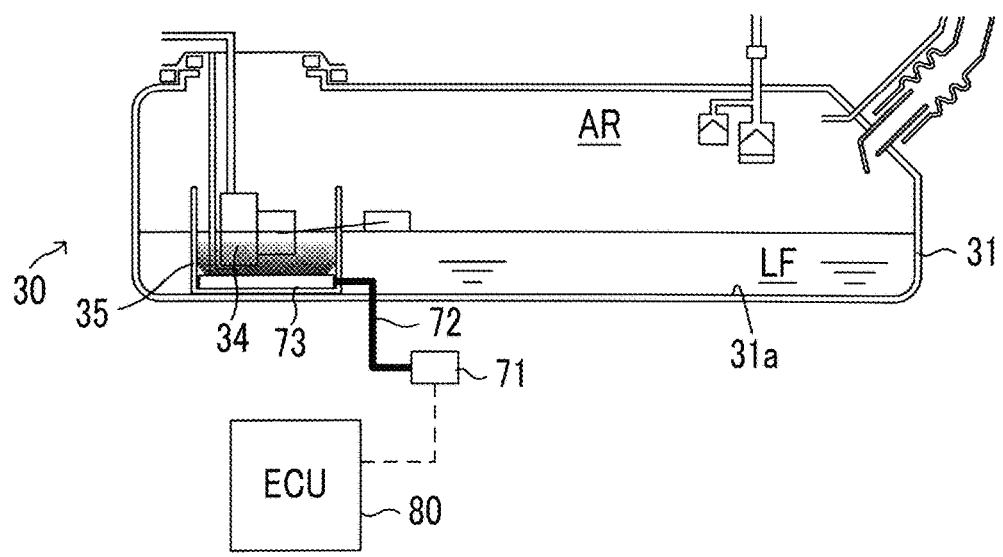
FIG. 11 is a schematic diagram showing an attachment position of an irradiation portion of a fuel reformer for an internal combustion engine according to a fifth embodiment of the present disclosure.

A fuel reformer (hereinafter, also referred to as "fifth device") of an internal combustion engine according to a fifth embodiment is different from the first device solely in that the irradiation portion 73 is disposed in the bottom portion of the sub-tank 35 so as to irradiate the fuel in the sub-tank 35 with ultraviolet light as shown in FIG. 11.

Even in a case where the vehicle body is inclined or a large acceleration is generated in the vehicle in a state where the total amount of the fuel stored in the fuel tank 31 is relatively small, the fuel remaining in the sub-tank 35 has a certain depth. Accordingly, even in this case, the fifth device can increase the possibility of irradiating the fuel with ultraviolet light, and can reduce the possibility of irradiating air in the fuel tank 31 with ultraviolet light.

Sixth Embodiment

A fuel reformer (hereinafter, also referred to as "sixth device") of an internal combustion engine according to a sixth embodiment is different from the first device solely in that the sixth device can change the level height threshold HLth according to a motion state of the vehicle (for example, a state where a longitudinal acceleration of the vehicle, a lateral acceleration of the vehicle, or a yaw rate of the vehicle is generated) that changes the level height HL of the fuel in the fuel tank 31.

For example, in a case where the level height threshold HLth is set while the vehicle is at a standstill, the level height HL exceeds the level height threshold HLth while the vehicle is at a standstill, but the level height HL of the fuel LF over the irradiation portion 73 may fall below the level height threshold HLth during turning and acceleration of the vehicle.

The sixth device changes the level height threshold HLth according to at least one of the yaw rate Yr of the vehicle, the longitudinal acceleration of the vehicle, and the lateral acceleration of the vehicle. For example, the sixth device can change the level height threshold HLth by applying an actual yaw rate Yr of the vehicle to a look-up table MapHLth (Yr) shown in FIG. 12 that defines a relationship between the level height threshold HLth and the yaw rate Yr of the vehicle. The look-up table is determined according to a relative position between the irradiation portion 73 and the fuel level sensor 37, a direction of the yaw rate Yr of the vehicle, a direction of the longitudinal acceleration of the vehicle, and a direction of the lateral acceleration of the vehicle. For example, when the direction of the yaw rate Yr of the vehicle is positive (the vehicle is turning left), the level height HL is higher than that set while the vehicle is at a standstill. In this case, the look-up table is determined such that, as the yaw rate Yr of the vehicle increases, the level height threshold HLth increases.

Accordingly, the sixth device can irradiate ultraviolet light at an appropriate timing irrespective of the motion state of the vehicle. Therefore, fuel reforming can be performed more frequently while efficiently suppressing the production of a large amount of ozone in the fuel tank 31. The yaw rate Yr of the vehicle may be detected by a yaw rate sensor (not shown), or may be estimated based on "a vehicle speed and a steering angle" detected by a sensor. The longitudinal acceleration of the vehicle may be detected by a longitudinal acceleration sensor (not shown), or may be obtained by time derivation of a value, which is obtained from a vehicle speed sensor measuring the vehicle speed. Further, the lateral acceleration of the vehicle may be detected by a lateral acceleration sensor (not shown), or may be estimated based on "a vehicle speed and a steering angle" detected by a sensor.

Figure 12:
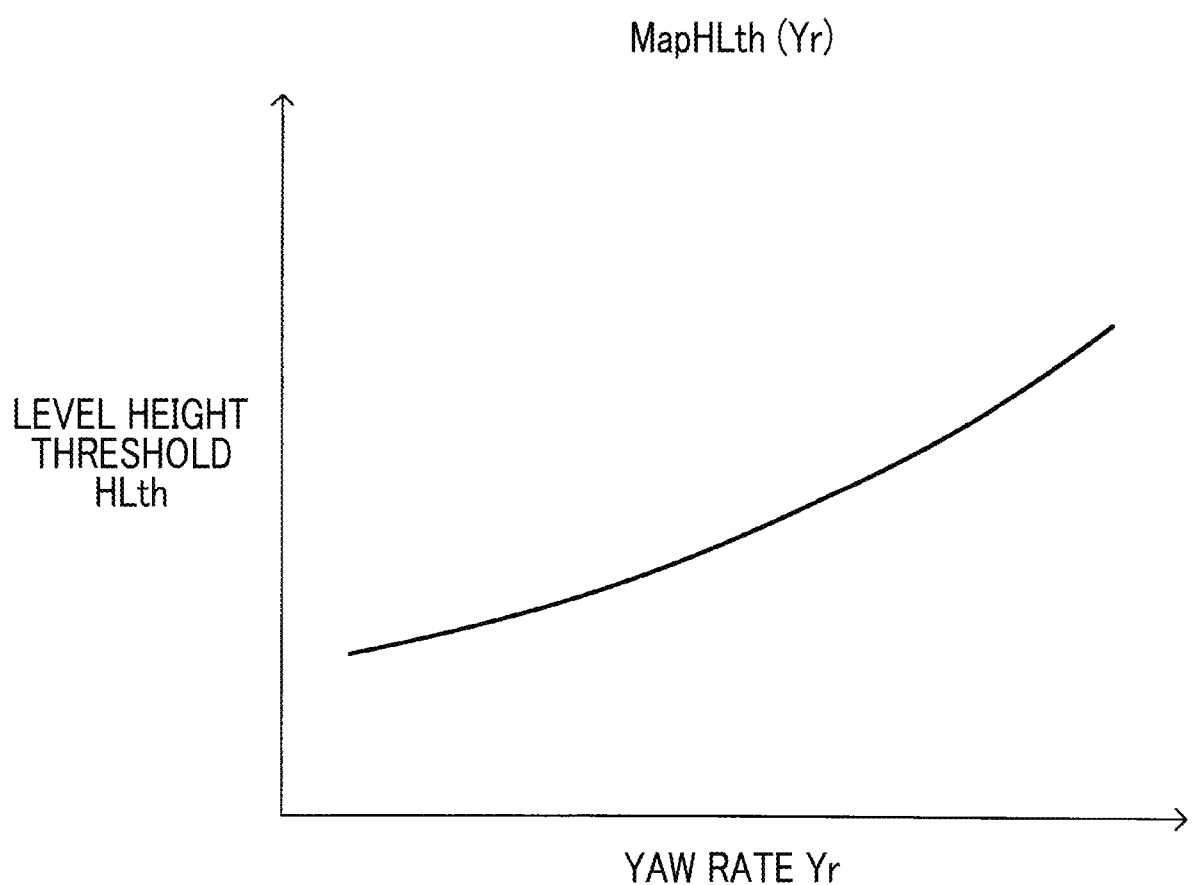
FIG. 12 is a look-up table to which a fuel reformer for an internal combustion engine according to a sixth embodiment of the present disclosure refers.

In a case where a yaw rate sensor in which a left turning direction is positive is used, the irradiation portion 73 is provided on the left side of the vehicle body, and the fuel level sensor 37 is provided on the right side of the vehicle body, the look-up table shown in FIG. 12 is applied when the vehicle is turning left.

The sixth device can change the level height threshold not only based on the yaw rate Yr of the vehicle but also based on the magnitude of an acceleration or deceleration rate Gx of the vehicle. In this case, the sixth device can change the level height threshold HLth by applying an actual acceleration or deceleration rate Gx to a look-up table MapHLth (Gx) that defines a relationship between the level height threshold HLth and the acceleration or deceleration rate Gx.

Modification Examples

The present disclosure is not limited to the embodiments, and various modification examples can be adopted within a range of the present disclosure as described below in detail.

For example, as the UV lamp included in the light source main body 71, a UV xenon lamp having a wavelength of 200 nm to 400 nm is used. However, an excimer lamp having a wavelength peak of 172 nm or 185 nm may also be used.

In the embodiments, as the light source of the irradiator 70, a UV xenon lamp that is an ultraviolet light source is used. However, a halogen lamp, a white light source such as an incandescent lamp or a cold cathode tube, or a single-color or white light source such as an organic EL, an LED, or a laser may also be used. For example, an LED backlight or a cold cathode tube backlight that is used as a light source of a liquid crystal TV may also be used as the irradiation portion.

The sub-tank 35 has a container shape that covers the vicinity of the fuel pump 34 and the bottom surface. However, the sub-tank 35 may be formed using a vertical wall that is provided to cover a region from the bottom surface 31a of the fuel tank 31 to the vicinity of the fuel pump 34.

What is claimed is:

1. A fuel reformer for a vehicle including an internal combustion engine, a fuel tank in which fuel of the internal combustion engine is stored, and a fuel supply device configured to supply the fuel in the fuel tank to the internal combustion engine, the fuel reformer comprising:
   an irradiator configured to emit light from an irradiation portion,
   wherein the irradiation portion is disposed at a position where the fuel stored in the fuel tank is irradiated with the light without the light passing through a gas phase region in the fuel tank, and wherein the light emitted from the irradiation portion is ultraviolet light.

2. The fuel reformer according to claim 1, wherein:

the irradiation portion is disposed at a position on an upper surface of a bottom wall of the fuel tank; and the irradiation portion is configured to emit the light to at least an upper region of the fuel tank.

3. The fuel reformer according to claim 1, wherein:

the irradiation portion is disposed to configure a part or an entire area of a bottom wall of the fuel tank; and the irradiation portion is configured to emit the light to at least an upper region of the fuel tank.

4. The fuel reformer according to claim 1, wherein:

the irradiation portion is disposed at a position on a lower surface of a bottom wall of the fuel tank;

the irradiation portion is configured to emit the light to at least an upper region of the fuel tank; and at least a portion of the bottom wall of the fuel tank that is irradiated with the light is formed of a material that allows transmission of light in a wavelength range of the light.

5. The fuel reformer according to claim 1, wherein:

the fuel tank includes a sub-tank that is disposed on an upper surface of a bottom wall of the fuel tank;

the sub-tank includes an opening formed in an upper surface;

the sub-tank includes a communication path formed in a side wall portion; and the irradiation portion is disposed at a position where fuel in the sub-tank is irradiated with the light in a direction from a bottom side of the sub-tank to an upper region of the sub-tank.

6. The fuel reformer according to claim 1, further comprising:

a remaining amount sensor configured to detect a remaining amount of the fuel stored in the fuel tank; and an electronic control unit configured to control the irradiator to emit the light from the irradiation portion in a case where the detected remaining amount of the fuel is a predetermined threshold or more and configured to control the irradiator to stop an emission of the light from the irradiation portion in a case where the detected remaining amount of the fuel is less than the threshold.

7. A fuel reformer for a vehicle including an internal combustion engine, a fuel tank in which fuel of the internal combustion engine is stored, and a fuel supply device configured to supply the fuel in the fuel tank to the internal combustion engine, the fuel reformer comprising:

an irradiator configured to emit light from an irradiation portion, a remaining amount sensor configured to detect a remaining amount of the fuel stored in the fuel tank; and an electronic control unit configured to control the irradiator to emit the light from the irradiation portion in a case where the detected remaining amount of the fuel is a predetermined threshold or more and configured to control the irradiator to stop an emission of the light from the irradiation portion in a case where the detected remaining amount of the fuel is less than the threshold, wherein the irradiation portion is disposed at a position where the fuel stored in the fuel tank is irradiated with the light without the light passing through a gas phase region in the fuel tank.

* * * * *

UNITED STATES PATENT AND TRADEMARK OFFICE
CERTIFICATE OF CORRECTION

PATENT NO. : 10,626,829 B2
APPLICATION NO. : 15/954017
DATED : April 21, 2020
INVENTOR(S) : Norio Inami Page 1 of 1

It is certified that error appears in the above-identified patent and that said Letters Patent is hereby corrected as shown below:

On the Title Page

Item (72), inventor city, delete "Susono" and insert --Susono-shi Shizuoka-ken--, therefor.

Signed and Sealed this
Second Day of June, 2020

Andrei Iancu
*Director of the United States Patent and Trademark Office*